(12) United States Patent
Largent

(10) Patent No.: US 6,231,288 B1
(45) Date of Patent: May 15, 2001

(54) CONVEYOR HEAD AND LIFT FOR FEEDING TIRES INTO A ROTATING KILN

(76) Inventor: Thomas R. Largent, 4821 Mountain Lakes Blvd., Redding, CA (US) 96003

(*) Notice: Subject to any disclaimer, the term of this patent is extended or adjusted under 35 U.S.C. 154(b) by 0 days.

(21) Appl. No.: 09/477,917

(22) Filed: Dec. 31, 1999

(51) Int. Cl.[7] .................................................. B65G 17/18
(52) U.S. Cl. ......................... 414/160; 414/149; 414/171; 414/173; 414/199; 110/246; 110/346; 198/463.4; 198/487.1; 198/531
(58) Field of Search .................................... 414/160, 149, 414/171, 173, 199; 110/346, 246; 198/463.4, 531, 487.1

(56) References Cited

U.S. PATENT DOCUMENTS

| | | |
|---|---|---|
| 413,902 | 10/1889 | Blanchard . |
| 1,415,990 | 5/1922 | Carstens . |
| 1,892,670 * | 1/1933 | Jaeger ................................ 198/463.4 |
| 2,212,702 * | 8/1940 | Scott ................................... 198/463.4 |
| 2,237,659 * | 4/1941 | Edwards ............................ 198/531 X |
| 2,813,822 | 11/1957 | Collier . |
| 3,083,846 | 4/1963 | Walker et al. . |
| 3,184,032 * | 5/1965 | Jonsson .............................. 198/463.4 |
| 3,357,689 | 12/1967 | Arneson et al. . |
| 3,742,875 | 7/1973 | Eberle . |
| 4,230,282 * | 10/1980 | Haase .................................... 241/159 |
| 4,234,283 * | 11/1980 | Twyman ................................ 414/171 |
| 4,551,051 | 11/1985 | Hofbauer et al. . |
| 4,714,031 | 12/1987 | Healy et al. . |
| 4,850,290 | 7/1989 | Benoit et al. . |
| 4,930,965 | 6/1990 | Peterson et al. . |
| 4,974,529 | 12/1990 | Benoit et al. . |
| 5,058,513 | 10/1991 | Benoit et al. . |
| 5,078,594 | 1/1992 | Tutt et al. . |
| 5,083,516 | 1/1992 | Benoit et al. . |
| 5,224,433 | 7/1993 | Benoit et al. . |
| 5,226,774 | 7/1993 | Tutt et al. . |
| 5,377,603 | 1/1995 | Reese et al. . |
| 5,473,998 * | 12/1995 | Allen et al. ....................... 110/246 X |
| 5,724,899 | 3/1998 | Reese et al. . |
| 5,806,442 * | 9/1998 | Aldred et al. ......................... 110/246 |
| 5,806,654 | 9/1998 | Largent . |

FOREIGN PATENT DOCUMENTS

| | | | |
|---|---|---|---|
| 686624 * | 12/1939 | (DE) | ................................. 414/149 |
| 31 09 781 A1 | 3/1981 | (DE) . | |

* cited by examiner

Primary Examiner—Steven A. Bratlie
(74) Attorney, Agent, or Firm—John P. O'Banion

(57) ABSTRACT

A tire conveyor and lift apparatus for conveying, lifting and orienting fuel tires for injection into a rotating cement kiln by force or by gravity. The apparatus brings tires from a tire source by a variable speed conveyor belt to a gate or alternatively vertical guiding rollers that regulate the flow of tires to the lift. Hooked lift arms engage the tire through the central hole and move vertically along a guide. The linear lift arms are mounted to an endless chain which is supported by upper and lower sprockets which are driven by a motor. The top of the guide is curved and has the curvature that approximates the circumference of the top sprocket. The tire is brought along the guide and released to output rollers connected to a feed chute which is aligned with a rotating kiln.

20 Claims, 5 Drawing Sheets

CONVEYOR HEAD AND LIFT FOR FEEDING TIRES INTO A ROTATING KILN

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to devices conveying worn tires for disposal or storage, and more particularly to a conveyor head feed apparatus for conveying, elevating and orienting whole tires for injection into a rotating kiln.

2. Description of the Background Art

Disposal of worn automobile tires has become a significant problem for many community landfills with limited available space. Tire shredding and chipping devices were developed, in part, to reduce the volume of material presented to landfills for disposal. However, tire shredding and chipping devices are costly to install and maintain, thus significantly raising the cost of disposal of each tire. Tires are also combustible and pose a threat of fire in landfills as well as transfer and storage facilities.

One alternative to shredding or landfill disposal is to incinerate the tires or burn the tires as a source of supplemental fuel in rotary kilns. Rubber tires burn extremely hot, and thus make a very good source of supplemental fuel for a rotary kiln.

Rotating kilns are frequently used in the production of cement. Because such kilns operate at extremely high temperatures, it is possible to burn various forms of liquid and solid combustible waste materials as a source of supplemental fuel. At the high temperatures found in such kilns, which are on the order of 3400 degrees Fahrenheit and above, the waste materials tend to combust fairly completely while producing little or no undesirable gaseous or solid emissions. Therefore, these waste materials can serve as a form a supplemental fuel, thereby reducing the demand for and cost of the primary fuel to fire the kiln.

In addition, the extremely high temperatures within a cement kiln will cause the rubber tires to burn without any significant liquid, solid or gaseous waste byproducts which might otherwise be detrimental to the environment. Burning worn out tires as secondary fuel in rotary cement kilns helps alleviate the growing problem of tire disposal without appreciably impairing the environment.

Many conventional feed systems used for injecting tires into a cement kiln require that the tires be cut and processed into "fuel packages" having relatively specific outer dimensions. Predictably, such preparation of used tires increases the overall cost of operating the kiln, and normally requires the use of special equipment and additional manpower to cut the tires and package the resulting pieces into suitably sized packages. Therefore, it is more efficient to inject whole tires into the kiln.

Whether shredded, incinerated or used as secondary fuel in a cement kiln, the tires need to be efficiently presented to the various devices for processing. A considerable amount of manual handling of the tires is required to properly present the tire to the entrance of the kiln or shredder. This handling normally includes changes in elevation from the tire storage or transfer point to the mouth of the kiln.

Accordingly, a need exists for an efficient automated apparatus that can change the elevation of a stream of tires and present the tires for injection into the kiln or shredding device at the proper orientation. The present invention satisfies that need, as well as others, and generally overcomes the deficiencies found in existing equipment.

BRIEF SUMMARY OF THE INVENTION

The present invention is an apparatus for changing the elevation of a stream of used tires and sequentially orienting the tires for feeding into a rotating cement kiln, shredding device, incinerator or storage area. One drawback to prior conveyor mechanisms is that a considerable amount of manipulation of the tires is required to present the tire to the mouth of the kiln from the tire source including changes in elevation and positioning at an appropriate angle. The apparatus of the present invention eliminates manual handling of the tires from tire transfer point to the mouth of the kiln or other processing device.

By way of example, and not of limitation, the invention includes a pair of wheels or sprockets supported by a housing. The first or base sprocket is positioned at ground level, and the second sprocket is positioned at a selected elevation above the base sprocket in the same plane. The second sprocket freely rotates about a central axis. The first sprocket is a drive sprocket attached to a motor or other means of rotation. An endless drive chain or drive belt connects the two wheels or sprockets. Forced rotation of the base drive sprocket produces rotation of the second sprocket and directional movement of the chain. It will be apparent that the drive motor can attached to the top sprocket rather than the base sprocket as an alternative.

A number of arms project laterally from the chain or belt and are securely fixed to the chain or belt. Arcuate hooks or knobs are present on the distal ends of the arms. The arms travel with the chain around the drive and top wheels or sprockets.

The outer housing of the conveyor head around the top sprocket includes a set of curved panels and a set of rollers. The panels have a curvature at one end which parallels the circumference of the top sprocket. The arc of the curved panel about the top sprocket is continued with a section in a line of rollers. Preferably the central axis point of each roller is approximately six degrees from the adjoining roller along the arc. This arc is continued until the roller line is at the proper angle that will provide the necessary alignment with the feed chute or mouth of the kiln.

In use, a stream of tires from a tire source moves along a conventional horizontal conveyor. An intake roller platform sequentially receives individual tires from the horizontal conveyor, preferably through a control gate. The platform may also be angled downwardly to utilize the forces of gravity to move the tire along the rollers. The platform has a notch that will allow the horizontal arm to pass through the center of the platform interdigitally as the chain and arm move vertically upward. Once through the notch in the platform, the arm engages the tire from below and the hook or knob is positioned at the center hole of the tire. As the tire is drawn upward, it pivots and aligns vertically on the arm.

The tires are in a vertical orientation when moved upwardly by the lift conveyor. As the tire approaches the top of the apparatus, it engages the outer surface of the curved housing panels with the arm passing between the panels. The tire is brought along the housing panels over the top to the rollers. The line of top rollers is notched and the arm passes between the two releasing the tire to the rollers in the process. A feed chute, conveyor or staging area is at the end of the line of rollers.

To ensure that tires and other materials will be gravity fed into the feed chute for the kiln, the rollers and chute apparatus are oriented on the support frame such that the plane of the feed rollers connected to the feed chute has an angle of inclination between approximately thirty-three degrees and approximately sixty degrees, and preferably forty-seven degrees.

An object of the invention is to efficiently convey whole tires for injection into the interior area of a rotating kiln.

Another object of the invention is to provide a conveyor mechanism that can efficiently change the elevation of a stream of waste tires without requiring manual positioning, Another object of the invention is to provide a conveyor feed system that is automatically controlled to deliver and orient tires for injection into a rotary kiln or storage area.

Another object of the invention is to provide a stream of tires for injection into a rotating kiln without creating a bottleneck.

Another object of the invention is to provide a feed conveyor apparatus for a rotating kiln that feeds tires into the kiln at a desired rate.

Another object of the invention is to provide a feed chute apparatus for conveying and orienting whole tires for injection into a cement kiln which eliminates the need to cut up or otherwise package the tires for injection.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 4, where like reference numbers denote like parts. It will be appreciated that the apparatus may vary as to configuration and as to details of the parts without departing from the basic inventive concepts disclosed herein.

Figure 1:
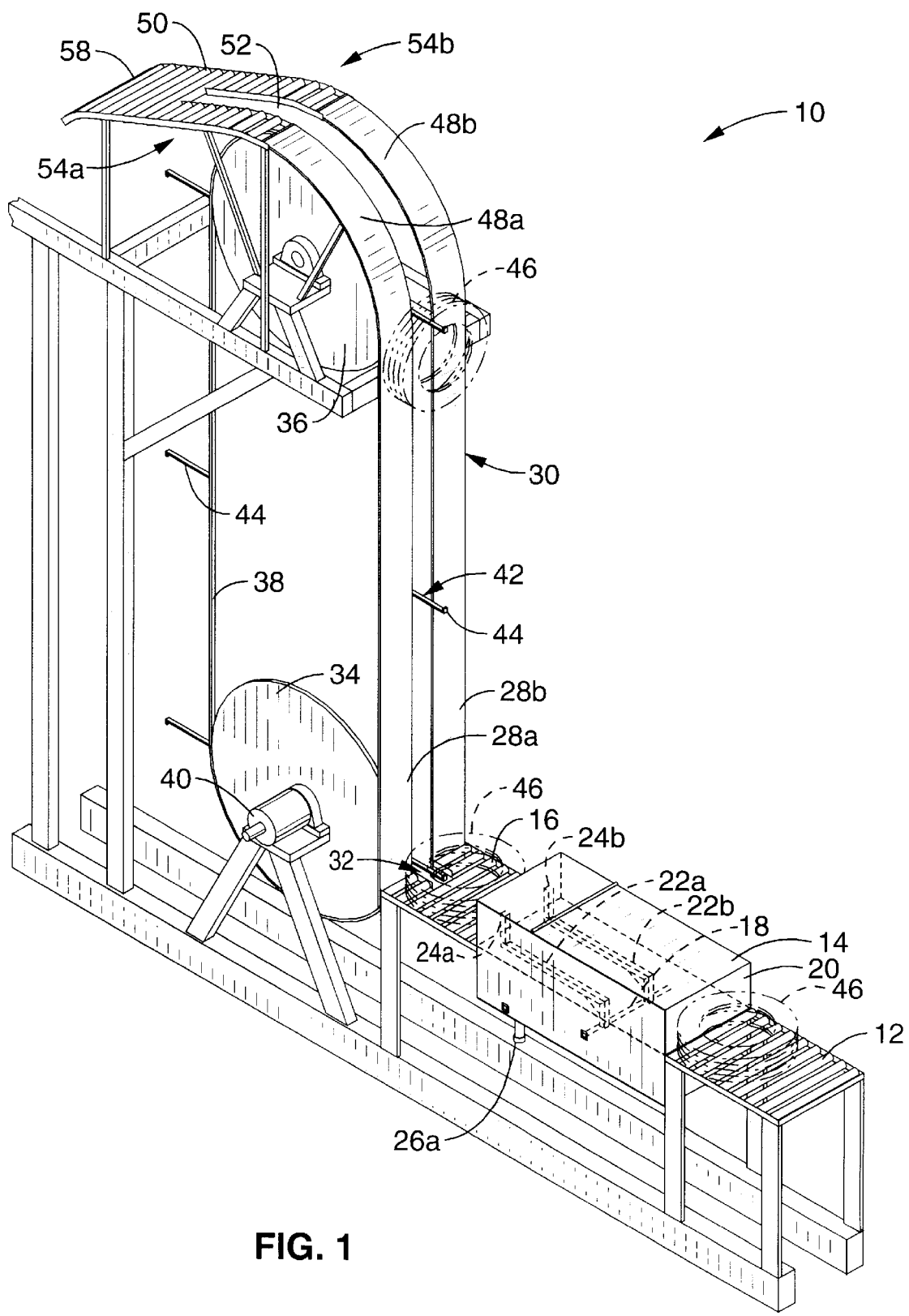
FIG. 1 is a perspective view of a tire lift and conveyor apparatus according to the present invention.

Referring first to FIG. 1, the invention comprises a tire conveyor and lift apparatus 10 that provides a stream of fuel tires at the proper elevation and orientation to be injected into a rotating cement kiln. Fuel tires, from a tire source, are transported, using a horizontal feed conveyor belt or the like (not shown), to control rollers 12 and control gate 14. Advancement of the feed conveyor belt may drive the line of tires to the rollers and control gate 14. Alternatively, it is preferred that control rollers 12, control gate 14 and intake rollers 16 are at descending angle so as to utilize gravity to cause the movement of the tires along the line.

Control gate 14 has a control mechanism 18 which is positioned beneath chute 20 as shown. In the embodiment shown, control mechanism 18 comprises an arm assembly having a pair of opposing and generally parallel arms 22a, 22b which are pivotally coupled at one end to the side walls of the housing using flange bearings or the like. A pair of posts 24a, 24b are positioned at the opposite ends of arms 22a, 22b, respectively, in a substantially perpendicular orientation in relation to the arms.

A pair of gate operators 26a, 26b (not shown) are attached to the undersides of arms 22a, 22b and impart pivoting motion to the arm assembly. Gate operators 26a, 26b are typically conventional hydraulic operated piston-type operating mechanisms that can be actuated by a timer or manually. Alternatively, gate operators 26a, 26b could be solenoid operated piston-type mechanisms or the like.

When control gate 14 is actuated, arms 22a, 22b pivot downwardly and posts 24a, 24b retract allowing individual tires to move along intake rollers 16 and abut the lower vertical sections 28a, 28b of skirt 30. Is can be seen, therefore, control gate 14 permits the sequential advancement of tires to intake rollers 16 and thereby controls the rate of tires presented to the idler rollers by timed repetitive starting and stopping events. These starting and stopping events are also preferably coordinated with the rotational speed of the lift conveyor. Intake rollers 16 are separated by a longitudinal slot 32 as shown. The rollers on either side of the slot 32 abut the vertical sections 28a and 28b of skirt 30. The distance between the two identical sections of skirt 30 is approximately equal to the width of slot 32.

The lift conveyor preferably includes a base sprocket 34 and a top sprocket 36 operably connected to an endless chain 38. As shown is FIG. 1 and FIG. 3, endless chain 38 simultaneously engages the circumference of sprocket 34 and sprocket 36. Accordingly, rotation of one sprocket will result in rotation of the other sprocket. An electric drive motor 40 is rotatably connected to base drive sprocket 34 allowing the base and top sprocket 36 and endless chain 38 to move at predetermined speeds.

Hooked lift arms 42 are secured to endless chain 38 and oriented to be perpendicular to the length of 38. Each lift arm 42 has a knob or hook 44 at the end of the arm opposite the attachment point with chain 38.

The lift conveyor is situated so that the hooked lift arms 42 travel through slot 32 of intake rollers 16 and the two sections of skirt 30 when moving in the vertical plane. Referring also to FIG. 2 and FIG. 3, tire 46 is positioned so that the center hole of the tire is generally centered over longitudinal slot 32. As each lift arm 42 rises through slot 32, it engages the bottom side of the tire. Hook 44 is disposed within the center of the generally horizontal tire. Continuing vertically above the intake rollers 16, tire 46 pivots to a vertical orientation under forces of gravity. Lift arm 42 thus engages tire 46 through the center hole at one engagement point. The tire travels upward in this vertical orientation along skirt 30 toward the top section of skirt 30.

Referring particularly to FIG. 2A through FIG. 2D, the upper section of skirt 30 has two arcuate sections 48a and 48b that are positioned parallel to the outer circumference of top sprocket 36. The edges of the skirt sections 48a, 48b abut output rollers 50. Notch 52 in output rollers 50 has a width that is the same as the distance between the members of the slide skirt and a depth that will allow passage of the lift arms.

The top sections 54a, 54b of output rollers 50 that are joined with sections 48a, 48b of skirt 30 follow the general curvature of sections 48a and 48b. It is preferred that the center of each roller be aligned approximately six degrees apart with the first roller being placed at approximately ninety degrees from horizontal. Sections 54a, 54b of output rollers 50 preferably follow an approximately thirty degree arc in approximately six degree increments and then continue tangentially in a plane. Accordingly, rollers 50 descend at approximately a thirty degree angle toward opening 60 of a feed chute 56. Feed chute 56 can simply be a hollow chute, or a feed chute apparatus with the capability to regulate the feed rate into a kiln. To ensure that the tires will be gravity fed into the kiln, the feed chute is oriented on the support frame such that the plane of the internal ramp (bottom wall) has an angle of inclination between approximately 33 degrees and approximately 60 degrees, and preferably 47 degrees. If rate regulation capability is desired, feed chute 56 can be configured in the same way as control gate 14. Alternatively, the feed chute apparatus with rate regulation capability described in detail in co-pending application Ser. No. 09/448,570 filed on Nov. 23, 1999, which is incorporated herein by reference, can be used.

Figure 2A:
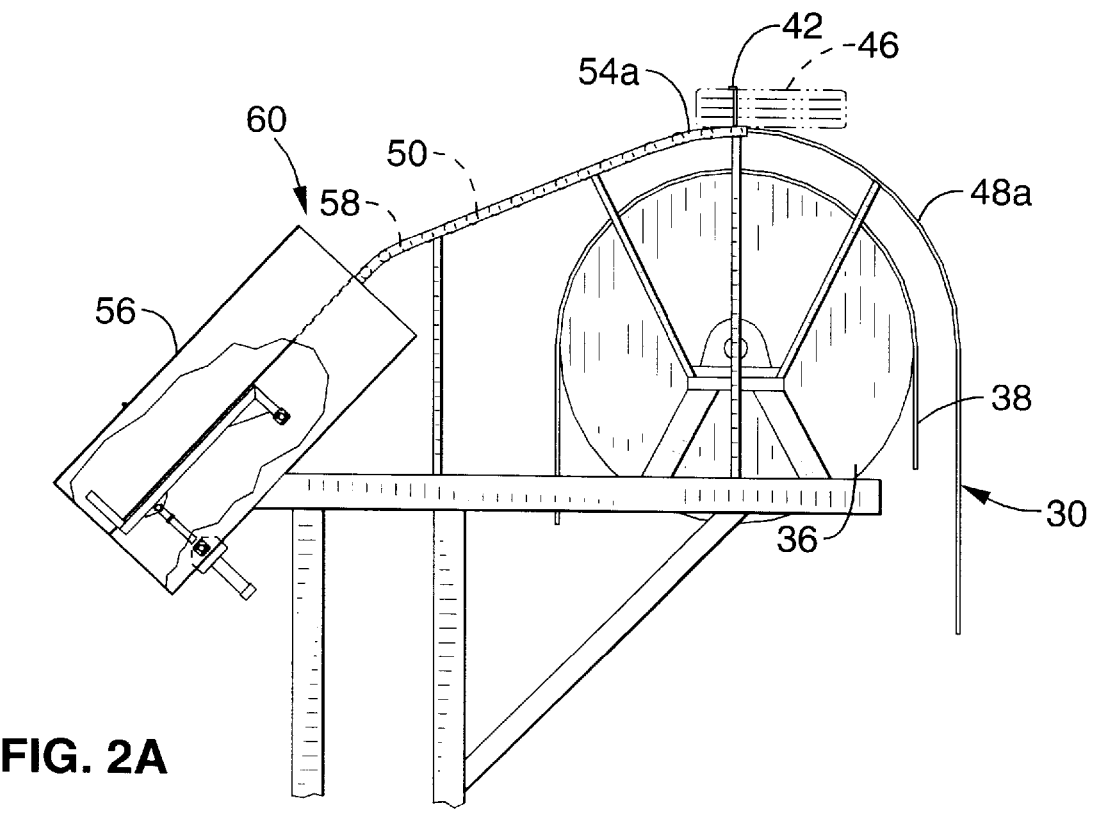
FIG. 2A is a partial view, in side elevation, of the upper portion of the apparatus shown in FIG. 1, showing a feed chute mechanism and showing a tire at the uppermost section of the apparatus engaging the top rollers.
Figure 2B:
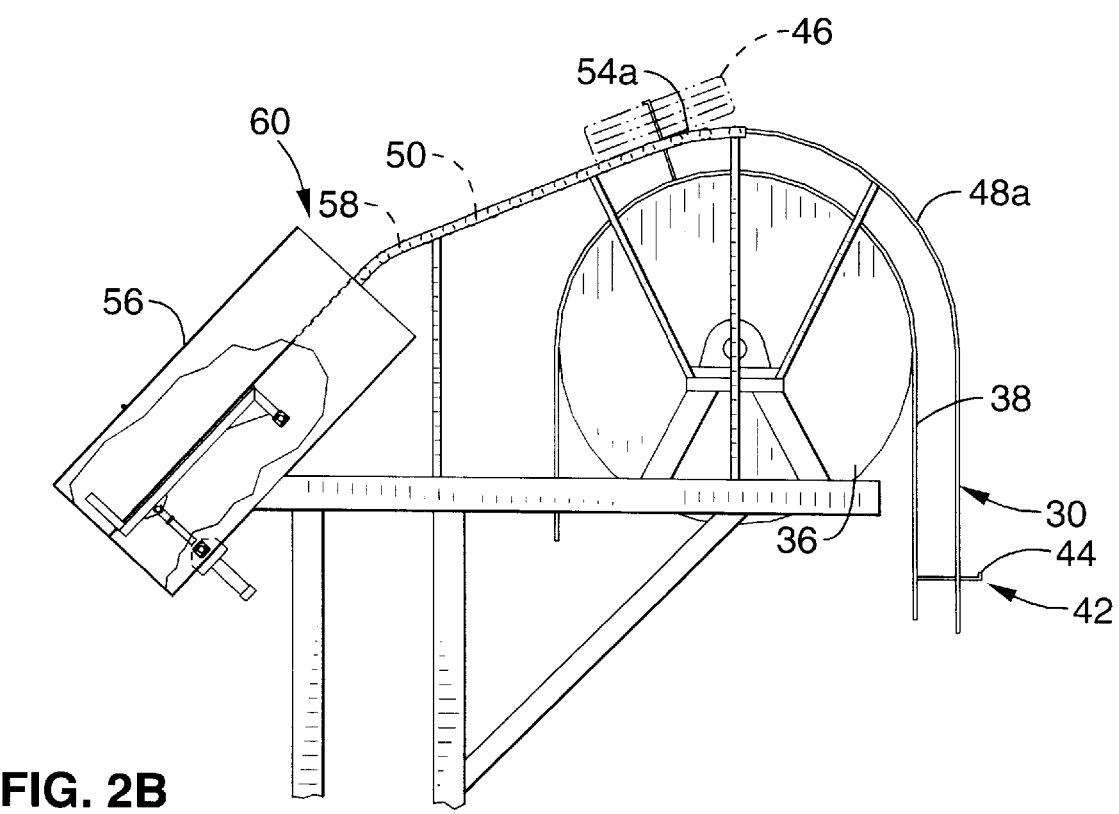
FIG. 2B is a partial view, in side elevation, of the upper portion of the apparatus shown in FIG. 1, showing a feed chute mechanism, showing a tire traveling along the arcuate section of the roller line, and showing the withdrawal of the lift arm.
Figure 2C:
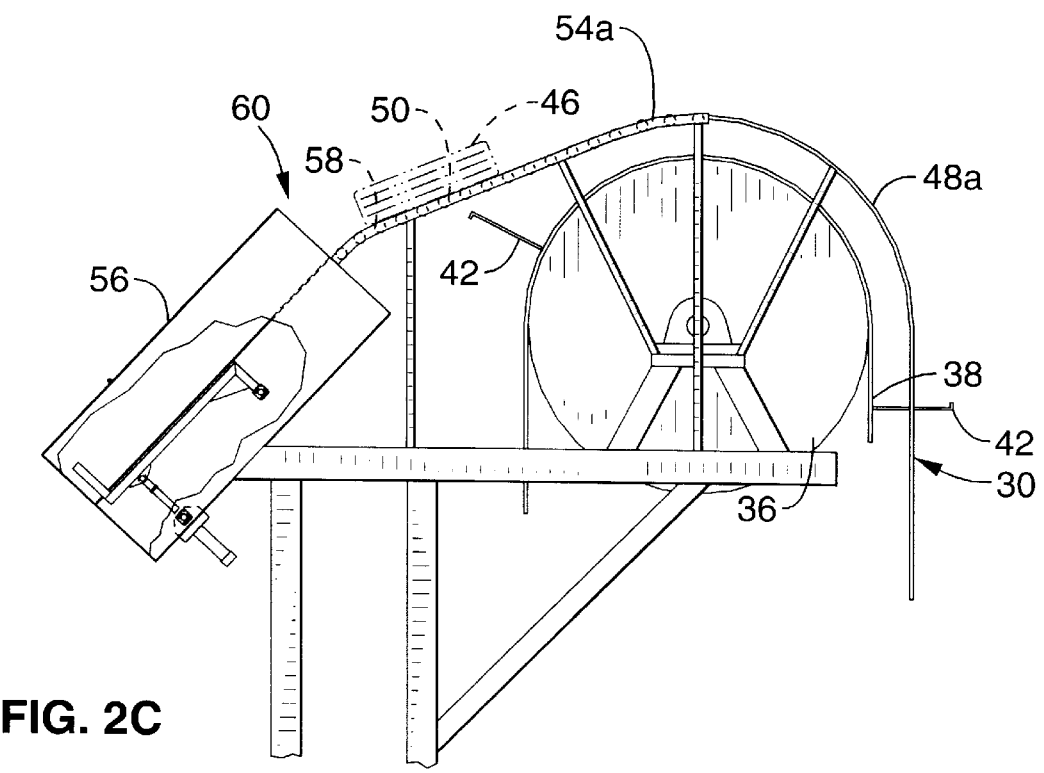
FIG. 2C is a partial view, in side elevation, of the upper portion of the apparatus shown in FIG. 1, showing a feed chute mechanism and showing the position of the tire prior to entry into the feed chute.
Figure 3:
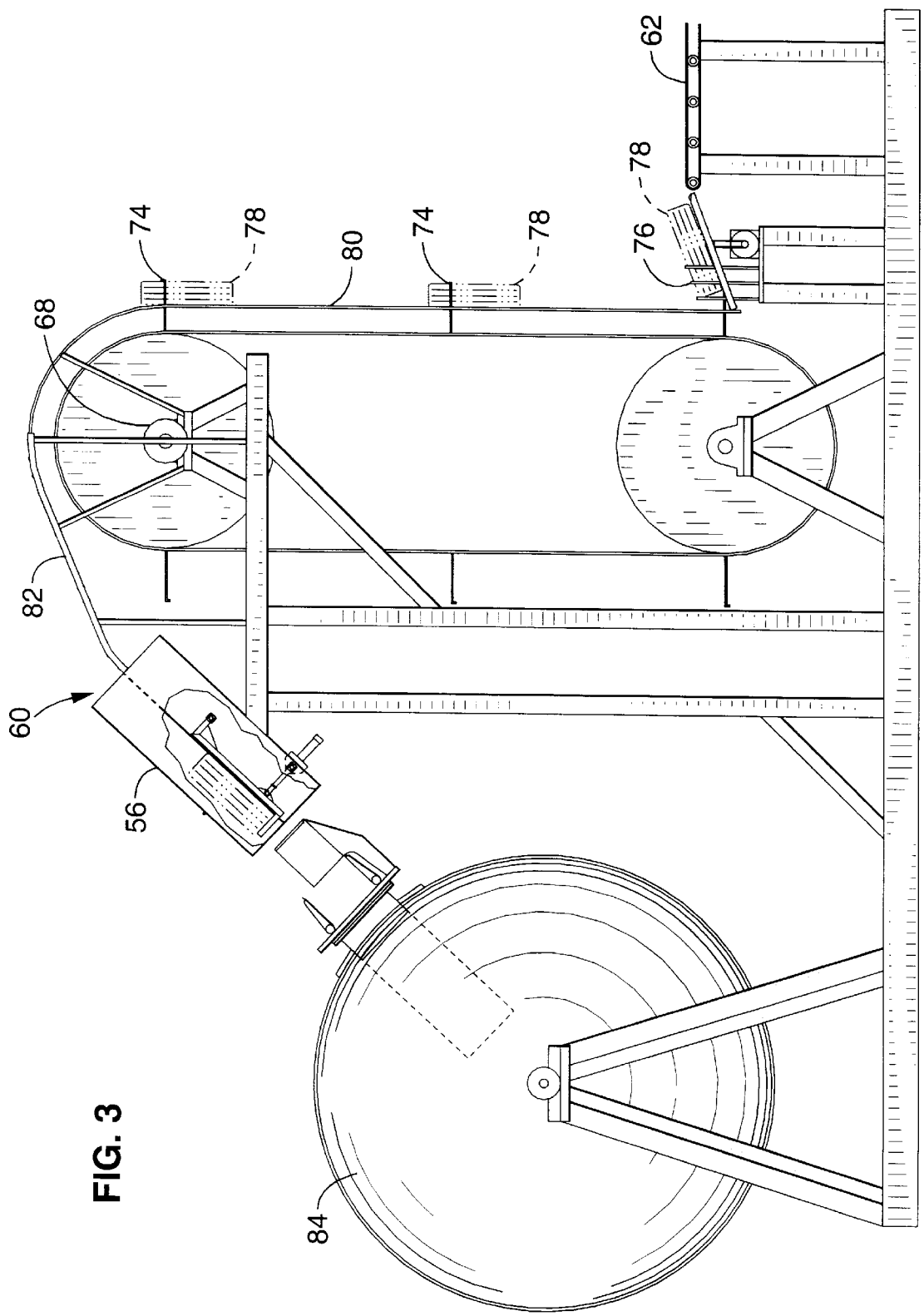
FIG. 3 is a schematic side elevational view of an alternative embodiment of the lift and conveyor head system of the present invention, shown with a feed chute and positioned adjacent to a rotating kiln.

As seen in FIG. 2B and FIG. 2C, lift arm 42 retreats from the center of the tire as the tire travels over curved output roller sections 54a, 54b and output rollers 50. Momentum, gravity and drag in the output conveyor rollers assist the release of the tire from lift arm 42. Lift arm 42 descends through notch 52 and tire 46 is free to roll down rollers 50 toward the feed chute and kiln. Output rollers 50 are preferably positioned at an angle to allow gravity to cause the motion of the tire down the rollers.

Note also that, while the angle of output rollers 50 is preferably 30 degrees, any angle between 30 and 60 degrees is suitable. This angle allows the tire to move without assistance down output rollers 50 yet remain in control as the tire reaches the transition rollers and feed chute 56.

Figure 2D:
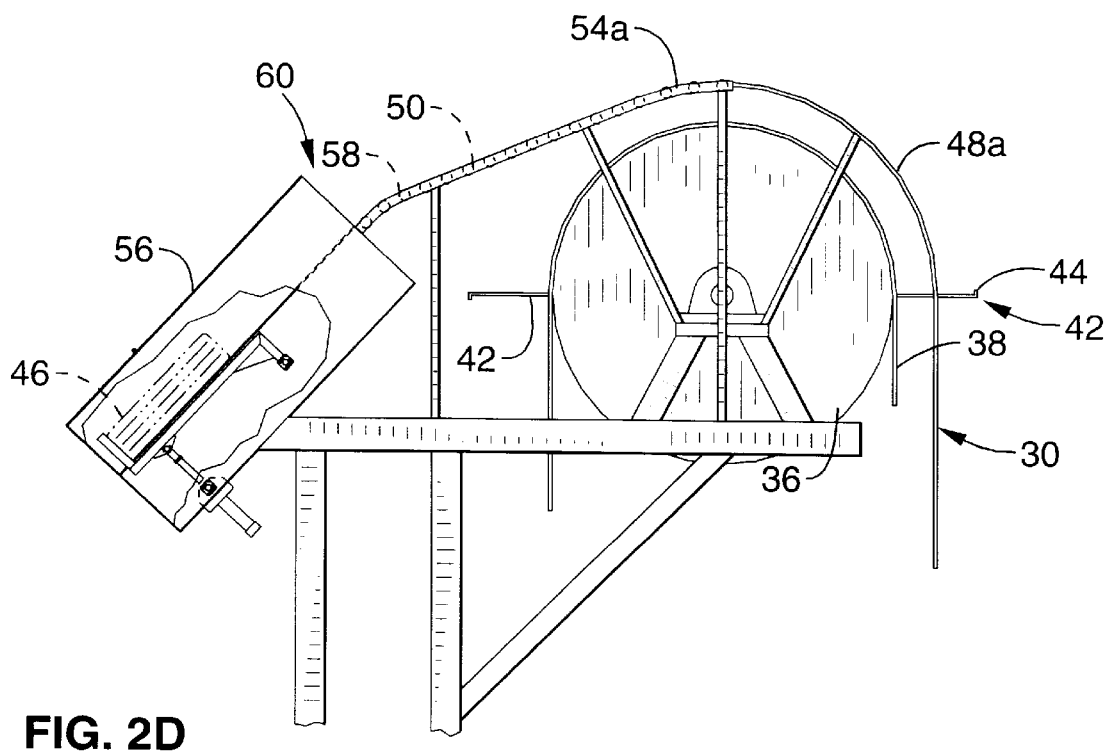
FIG. 2D is a partial view, in side elevation, of the upper portion of the apparatus shown in FIG. 1, showing the tire in the feed chute to be fed into the kiln.

Referring to FIG. 1 and FIG. 2D, proper positioning of the gravity feed chute apparatus in relation to the kiln is critical in order for the tires to be injected by the force of gravity. Transition rollers 58 at the end of rollers 50 opposite notch 52 are preferably inserted into or positioned immediately adjacent opening 60 of feed chute 56. The number of transition rollers may vary depending on the change in angle necessary between output rollers 50 and the opening 60 of feed chute 56.

In operation, the tires are directed into the feed chute apparatus 56 by gravity. As the kiln rotates, the feed opening of the kiln eventually comes into alignment with the feed chute 56. At that point, the tire is released from the feed chute and into the kiln since the angle of inclination is sufficient to allow the material to be gravity fed out the end of the feed chute.

FIG. 3 shows an alternative embodiment of the invention. In this embodiment, a conveyor belt 62 brings the fuel tires from a tire source to upper idler rollers 64. The conveyor belt may determine the rate of tires presented to the idler rollers by timed repetitive starting and stopping events. These starting and stopping events are also preferably coordinated with the rotational speed of the lift conveyor.

Figure 4:
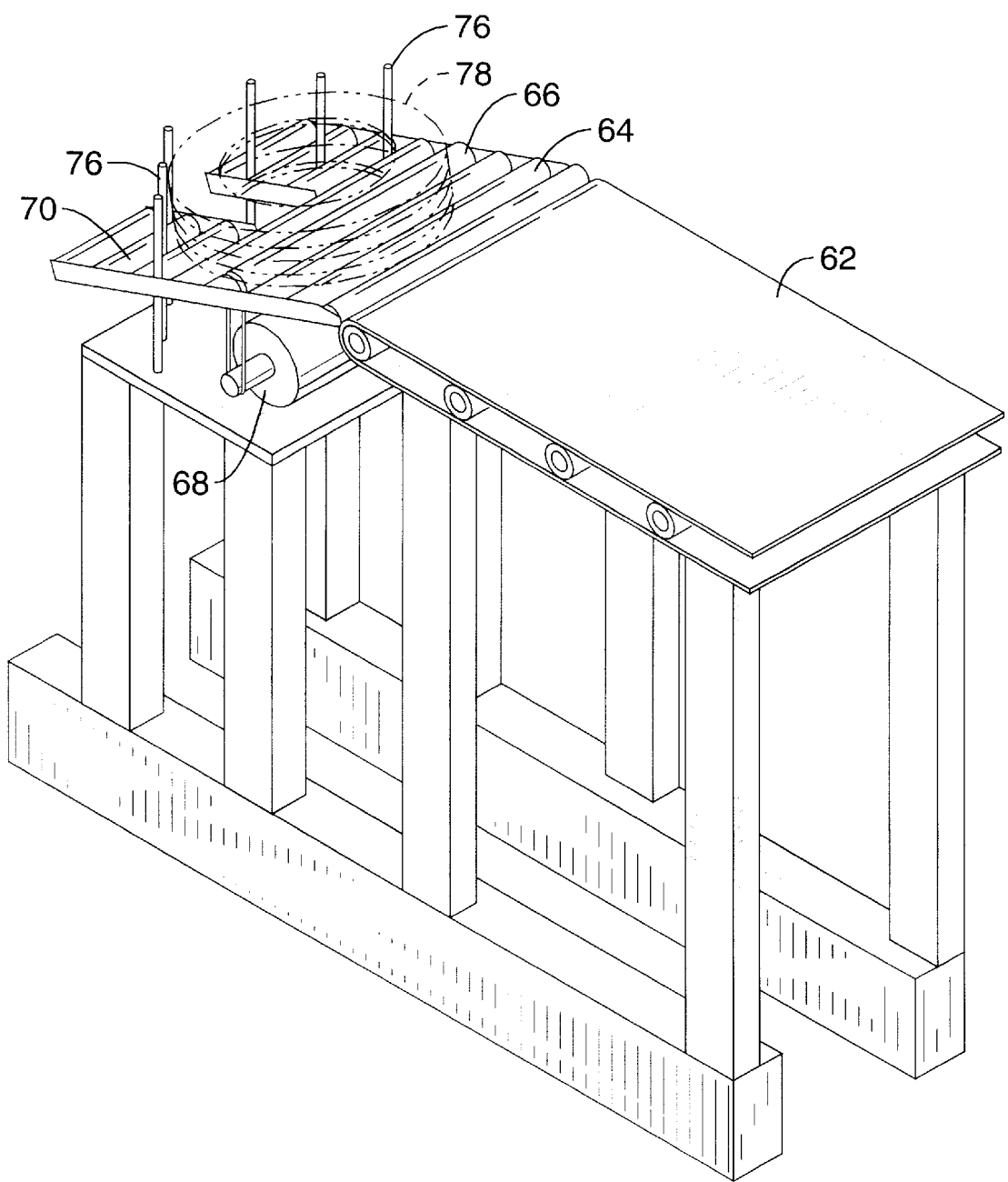
FIG. 4 is a perspective view of the tire intake section of the alternative embodiment of the invention shown in FIG. 3 showing the conveyor, idler rollers and vertical centering rollers.

Referring also to FIG. 4, a power roller 66, in line with upper idler rollers 64, is rotated by a motor 68. Power roller 66 may be larger in circumference than the idler rollers but the upper surface of power roller 66 should be on the same level as the idler rollers. Lower idler rollers 70 are adjacent to power roller 66 and on the same plane. It is preferred that the line of idler rollers 64, 70 and power roller 66 be at an angle of approximately 20 degrees in relation to a horizontal plane. Lower idler rollers 70 are preferably separated by a notch 72 as shown to facilitate the upward movement of hooked lift arms 74 through lower idler rollers 70.

Vertical centering rollers or posts 76 are disposed between several lower idler rollers 70 preferably symmetrically with respect to notch 72. The vertical centering rollers 76 are preferably sequentially arranged to form a point.

In use, a tire 78 is driven by conveyor belt 62 to upper idler rollers 64. Power roller 66 facilitates the movement of tire 78 down the line until it engages lower idler rollers 70 and vertical rollers 76. Tire 78 is oriented directly over notch 72 thereby. Lift arm 74 passes through notch 72 and engages and lifts tire 78 upwardly along slide skirt 80 to output rollers 82, to feed chute 56 and into kiln 84.

Accordingly, it will be seen that this invention provides a simple and effective way of conveying, lifting and orienting waste tires for introduction into a rotating kiln using gravity or injection feed. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A conveyor head apparatus for lifting and orienting tires for injection into a rotating kiln, comprising:

(a) an input conveyor;

(b) an elevator mechanism configured to receive a tire from said input conveyor;

(c) an output conveyor configured to receive a tire from said elevator mechanism;

(d) a tire guide associated with the input conveyor, the elevator mechanism and the output conveyor; and (e) a control mechanism associated with said input conveyor and configured to regulate the rate of conveyance of a tire to said elevator mechanism.

2. An apparatus as recited in claim 1, further comprising a feed chute configured to receive a tire from said output conveyor, said feed chute positioned at an angle of inclination sufficient for said tire to be gravity fed into a rotating kiln.

3. An apparatus as recited in claim 1, wherein said input conveyor comprises:

(a) a conveyor belt; and (b) a plurality of rollers associated with said conveyor belt.

4. An apparatus as recited in claim 3, wherein said rollers include a power roller, and further comprising a motor operably connected to said power roller for imparting rotational motion to said power roller.

5. An apparatus as recited in claim 1, wherein said elevator mechanism comprises:

(a) a first rotating disk, said first rotating disk capable of rotating around a first central axis, said first rotating disk coupled to a motor;

(b) a second rotating disk, said second rotating disk capable of rotating around a second central axis;

(c) an endless lift member, said lift member operably connected to said first rotating disk and to said second rotating disk, wherein motion of said first rotating disk imparts motion to said second rotating disk and said lift member; and (d) a plurality of elongate lift arms mounted to said lift member.

6. An apparatus as recited in claim 5, wherein said first rotating disk and said second rotating disk comprise sprockets and said endless lift member comprises a chain.

7. An apparatus as recited in claim 5, wherein each said lift arm includes a hook positioned at an end of said lift arm distal to the point of attachment of said lift arm to said lift member.

8. An apparatus as recited in claim 5, wherein said output conveyor comprises a plurality of arcuate rollers spaced apart so as to form a notch therebetween dimensioned to allow passage of said lift arms therethrough.

9. A conveyor head apparatus for lifting and orienting tires, comprising:

(a) a speed regulated tire input conveyor;

(b) a lift mechanism configured to receive a tire from said input conveyor, said lift mechanism having a guide;

(c) an output conveyor coupled to said guide; and (d) a control mechanism associated with said input conveyor and said lift mechanism configured to coordinate the movement of the lift mechanism and the input conveyor.

10. An apparatus as recited in claim 9, further comprising a feed chute configured to receive a tire from said output conveyor, said feed chute positioned at an angle of inclination sufficient for said tire to be gravity fed into a rotating kiln.

11. An apparatus as recited in claim 9, wherein said input conveyor comprises:

(a) a conveyor belt capable of variable speeds;

(b) a roller assembly operably coupled to said conveyor belt; and (c) a regulating mechanism associated with said conveyor belt and said control mechanism, wherein the speed of said conveyor belt can be coordinated with the speed of said lift mechanism.

12. An apparatus as recited in claim 11, wherein said roller assembly includes a power roller, and further comprising a motor operably connected to said power roller imparting rotational motion to said power roller.

13. The apparatus as recited in claim 11, wherein said regulating mechanism comprises:

(a) a gate assembly associated with said conveyor belt and said roller assembly; and (b) a mechanism for opening and closing said gate assembly.

14. An apparatus as recited in claim 11, wherein said lift mechanism comprises:

(a) a first rotating disk, said disk capable of rotating around a first central axis, said first rotating disk coupled to a motor;

(b) a second rotating disk, said second rotating disk capable of rotating around a second central axis;

(c) an endless lift member operably connected to said first rotating disk and to said second rotating disk wherein motion of said first rotating disk imparts motion to said second rotating disk and said lift member; and (d) a plurality of elongate lift arms mounted to said lift member.

15. An apparatus as recited in claim 14, wherein said first rotating disk and said second rotating disk comprise sprockets and said endless lift member comprises a chain.

16. An apparatus as recited in claim 14, wherein said each said lift arm includes a hook positioned distal to the point of attachment of said lift arm to said lift member.

17. An apparatus as recited in claim 14, wherein said output conveyor comprises a roller assembly.

18. An apparatus as recited in claim 17, wherein said roller assembly comprises a plurality of arcuate rollers spaced apart to form a notch therebetween dimensioned to allow passage of said lift arms therethrough.

19. A conveyor head apparatus for lifting and orienting tires for injection into a rotating kiln, comprising:

(a) an input conveyor;

(b) a first rotating disk, said first rotating disk capable of rotating around a first central axis, said first rotating disk coupled to a motor;

(c) a second rotating disk, said second rotating disk capable of rotating around a second central axis;

(d) an endless lift member, said lift member operably connected to said first rotating disk and to said second rotating disk, wherein motion of said first rotating disk imparts motion to said second rotating disk and said lift member, and wherein said lift member is configured to receive a tire from said input conveyor;

(e) a plurality of elongate lift arms mounted to the lift member;

(f) an output conveyor configured to receive a tire from said lift member;

(g) a guide associated with said input conveyor, said lift member and said output conveyor;

(h) a control mechanism associated with said input conveyor and configured to regulate the rate of conveyance of a tire to said lift member; and (i) a feed chute configured to receive a tire from said output conveyor, said feed chute positioned at an angle of inclination sufficient for said tire to be gravity fed into a rotating kiln.

20. An apparatus as recited in claim 19, wherein said input conveyor comprises:

(a) a conveyor belt;

(b) a plurality of rollers associated with said conveyor belt, said rollers including a power roller; and (c) a motor operably connected to said power roller for imparting rotational motion to said power roller.

* * * * *